United States Patent [19]

Huguenin et al.

[11] Patent Number: 5,560,772
[45] Date of Patent: Oct. 1, 1996

[54] YELLOW/ORANGE PIGMENTS COMPRISING ZIRCONIUM OXIDE AND CERIUM, PRASEODYMIUM AND/OR TERBIUM VALUES

[75] Inventors: Denis Huguenin; Fabienne Pettini, both of Paris; Thierry Seguelong, Nanterre, all of France

[73] Assignee: Rhone-Poulenc Chimie, Courbevoie Cedex, France

[21] Appl. No.: 339,178

[22] Filed: Nov. 10, 1994

[30] Foreign Application Priority Data

Nov. 18, 1993 [FR] France .................. 93 13764

[51] Int. Cl.⁶ .................. C09C 1/00; C04B 14/02
[52] U.S. Cl. .................. 106/451; 106/403; 106/450; 106/170.58; 106/198.1; 106/204.01
[58] Field of Search .................. 106/403, 450, 106/451, 903

[56] References Cited

U.S. PATENT DOCUMENTS

| | | | |
|---|---|---|---|
| 2,992,123 | 7/1961 | Seabright | 106/451 |
| 3,012,898 | 12/1961 | Seabright | 106/451 |
| 3,168,410 | 2/1965 | Bruneau | 106/451 |
| 3,514,252 | 5/1970 | Levy, Jr. et al. | 106/450 |
| 3,539,371 | 11/1970 | Weber | 106/451 |
| 3,573,080 | 3/1971 | Bell et al. | 106/451 |
| 3,756,840 | 9/1973 | Gascon | 106/451 |
| 3,899,347 | 8/1975 | de Ahna et al. | 106/451 |
| 5,275,649 | 1/1994 | Linke et al. | 106/451 |
| 5,318,765 | 6/1994 | Binder et al. | 106/450 |

FOREIGN PATENT DOCUMENTS

| | | |
|---|---|---|
| 0241329 | 10/1987 | European Pat. Off. . |
| 2590887 | 6/1987 | France . |
| 895569 | 5/1962 | United Kingdom . |

OTHER PUBLICATIONS

Database WPI, Week 9114, Derwent Publications Ltd., London, GB, AN 91–096665 (no month).
Chemical Abstracts, vol. 81, No. 14, Oct. 7, 1974, abstract No. 81645m, p. 253 (no month).
Booth et al. "The preperation & properties of some zirconium stains", Transactions of the British Ceramic Society, vol. 61 No. 7, 1962, pp. 359–400. (no month).

*Primary Examiner*—Mark L. Bell
*Assistant Examiner*—Michael Marcheschi
*Attorney, Agent, or Firm*—Burns, Doane, Swecker & Mathis, L.L.P.

[57] ABSTRACT

Nontoxic yellow/orange pigment compositions, well suited for the coloration of a wide variety of substrates, for example paints, varnishes, plastics, ceramics, etc., comprise a major amount of a zirconium oxide and an additive amount of cerium, praseodymium and/or terbium values, such rare earth values being in the form of the oxides thereof.

26 Claims, No Drawings

YELLOW/ORANGE PIGMENTS COMPRISING ZIRCONIUM OXIDE AND CERIUM, PRASEODYMIUM AND/OR TERBIUM VALUES

BACKGROUND OF THE INVENTION

1. Field of the Invention

The present invention relates to novel pigments based on zirconium oxide, to a process for the preparation thereof and to the coloration of a wide variety of substrates utilizing such novel pigments.

2. Description of the Prior Art

Inorganic pigment colorants are today widely used in many industries, especially in those of paints, plastics and ceramics. For such applications, the properties of, inter alia, thermal and/or chemical stability, dispersibility (ability of the product to disperse properly in a given medium), intrinsic color, coloring power and opacifying power, constitute a number of particularly important criteria to be taken into consideration in the selection of a suitable pigment.

Unfortunately, the majority of inorganic pigments which are suitable for applications such as the above and which are currently actually employed on an industrial scale generally comprise metals (especially cadmium, lead, chromium or cobalt), the use of which is becoming increasingly strictly controlled, indeed banned, by government legislation and regulation in many countries due to their reputedly very high toxicity.

This is particularly the case in respect of yellow pigments based on cadmium sulfides or lead chromite.

Thus, serious need continues to exist in this art for novel replacement inorganic pigments that are economically viable, suitable for use on an industrial scale and which otherwise avoid the above disadvantages and drawbacks to date characterizing the state of this art.

SUMMARY OF THE INVENTION

Accordingly, a major object of the present invention is the provision of novel pigments, yellow/orange in coloration, which are devoid of the above indicated high-toxicity problem.

Briefly, the present invention features, in a first embodiment thereof, novel yellow colored pigments based on a zirconium oxide of essentially monoclinic form and comprising an additive amount of cerium values.

This invention also features, in a second embodiment thereof, novel orange-yellow pigments based on a zirconium oxide of essentially monoclinic form, comprising an additive amount of praseodymium values, and having a chromaticity coordinate a (measured according to the standard described below) of at least 10.

The present invention also features, in a third embodiment thereof, novel orange-yellow pigments based on a zirconium oxide and comprising an additive amount of terbium values.

In a fourth embodiment of this invention, novel orange-yellow pigments are provided, based on a zirconium oxide and comprising additive amounts of both cerium and praseodymium values.

The present invention also features a process for the preparation of the aforesaid novel pigments, comprising intimately admixing the oxides of zirconium and of those additives indicated above, or precursors thereof, and then calcining the admixture thus formulated.

DETAILED DESCRIPTION OF BEST MODE AND PREFERRED EMBODIMENTS OF THE INVENTION

More particularly according to the present invention, the subject novel pigments are based on zirconium dioxide $ZrO_2$ which constitutes the major component thereof. These novel pigments additionally comprise at least one additive selected from among cerium, praseodymium and terbium, as described above. The additives are present in the pigment essentially in the form of the oxides thereof. The total content of additive is generally at most 20%, preferably at most 10% and more preferably at most 5%, expressed by weight of additive oxide. Moreover, the minimum content is generally at least 0.5% and more particularly at least 1%.

It should be appreciated that the pigments of the invention include all those which are obtained by combining two or more of the above additives. In the case of the third embodiment, namely, the pigments based on zirconium and terbium, such pigments can additionally comprise cerium and/or praseodymium values.

In the event of a cerium/praseodymium pairing, the cerium preferably constitutes at least 50% and more preferably at least 90% by weight of the cerium/praseodymium couple. The cerium permits obtaining, in this case, pigments in which the zirconium oxide is present solely in the monoclinic form.

In a preferred embodiment of the invention, the additive(s) is/are at least partially and preferably entirely enclosed or confined within the lattice of the zirconium oxide such that the pigment constitutes a solid solution. In this instance, the pigment exhibits a high phase purity because the presence of a phase of the oxide of the additive is not observed.

The crystalline state of the zirconium dioxide can vary according to the level of additive present in the pigment. In the case of the first, second and fourth embodiments of the invention, the zirconium oxide exists essentially in the monoclinic state. For the third embodiment, the zirconium oxide can develop from a 100% monoclinic structure to a 100% tetragonal structure and, more particularly, to an 80% tetragonal and 20% monoclinic structure. For the first, second and fourth embodiments and according to a specific variant of the third embodiment, the content of zirconium oxide in the tetragonal state is at most 30% by volume and more particularly at most 20%. The amount of the various phases is measured according to the technique of Evans et al, *British Ceram. Trans. J.*, 83, pp. 39–43 (1984). It will be appreciated that the higher the content of tetragonal phase, the more the coloration shifts towards yellow.

The pigments of the invention can also comprise a stabilizing agent of the crystalline structure of the zirconium oxide. These stabilizing agents are well known to this art and typically comprise rare earth metals. Exemplary thereof is yttrium. It will of course be appreciated that the rare earth metals described above as additives to the pigment inherently serve as stabilizing agents for the zirconium dioxide. In addition to the aforementioned rare earth metals, other rare earth metals can therefore comprise the pigment compositions of the invention, as stabilizing agents therefor. By "rare earth" metals are intended, in addition to yttrium, the elements of the Periodic Table having atomic numbers of from 57 to 71, inclusive.

When yttrium is employed in the third embodiment of the invention, the zirconium oxide can be stabilized in the cubic form, to obtain a product which is 100% in the cubic form. This structure imparts a pale-yellow color to the pigment.

Lastly, as regards the chromaticity coordinates of the compositions of the invention, the compositions according to the second embodiment preferably have an a coordinate of at least 15; likewise as regards the compositions according to the fourth embodiment in the event that the cerium content is at most 50%. Finally, in the context of the third embodiment, the coordinate a is preferably at least 10.

The process for the preparation of the pigments of the invention will now be described.

This process essentially consists of two stages. In the first, a mixture comprising the oxides of zirconium and of the additives or stabilizing agents indicated above, or precursors of such oxides, is formulated. Exemplary oxide precursors include the salts of organic or inorganic acids, such as nitrates, chlorides, sulfates, acetates or oxalates. The amounts of oxides or of precursors are adjusted such as to correspond to the stoichiometry of the desired final product.

It will also be appreciated that, in the formulation of the mixture, no compounds capable of supplying silicon, for example silica, are introduced. Nor are any compounds introduced that, in the subsequent reaction, would produce a significant amount of zircon (zirconium silicate). Stated differently, the operation is carried out under conditions such that the zirconium will be present in the pigment substantially in the form of zirconium oxide. The procedure is preferably carried out in the absence of flux.

As regards the starting material zirconium dioxide, an oxide is preferred having a mean particle size of at least 5 μm. In the case of a stabilized zirconium oxide, a product which is particularly well suited is that described in FR-A-2,595,680. For the additives, it is advantageous to use mixed oxides or salts such as, for example, $(Ce,Pr)O_2$. In this event, a more intense color is obtained.

In a second stage, the mixture is calcined. This calcination generally is carried out under air. The temperature is generally at least 1,550° C. and more particularly ranges from 1,600° to 1,700° C. The duration of the calcination is approximately 1 to 12 hours and preferably at least 3 hours.

Upon completion of the calcination, the product can be ground and/or deagglomerated according to any known means to adjust the particle size to the desired value according to the application intended for the pigment.

The pigments according to the invention are well suited for the coloration/pigmentation of a very wide variety of substrates, such as plastics, paints and ceramics.

Thus, they can be used for the coloration of plastics which can be of thermoplastic or thermosetting type.

Exemplary such thermoplastic resins suitable for coloration according to the invention include poly(vinyl chloride), poly(vinyl alcohol), polystyrene, styrene/butadiene, styrene/acrylonitrile or acrylonitrile/butadiene/styrene (A.B.S.) copolymers, acrylic polymers, especially poly(methyl methacrylate), polyolefins such as polyethylene, polypropylene, polybutene or polymethylpentene, cellulose derivatives such as, for example, cellulose acetate, cellulose acetobutyrate or ethyl cellulose, or polyamides including polyamide or nylon 66.

Exemplary thermosetting resins for which the pigments according to the invention are also suitable include the phenoplasts, aminoplasts, especially urea/formaldehyde or melamine/formaldehyde copolymers, epoxy resins and thermosetting polyesters.

The pigments of the invention can also be used for the coloration of special polymers, such as fluorinated polymers, in particular polytetrafluoroethylene (P.T.F.E.), polycarbonates, silicone elastomers or polyimides.

In the specific application for the coloration of plastics, the pigments of the invention can be used directly in the form of powders. They can also, preferably, be employed in a predispersed form, for example as a premix with a portion of the resin, in the form of a concentrated paste or of a liquid. This permits introduction thereof at any stage in the manufacture of the resin, a particularly significant advantage of the pigments according to this invention.

Thus, the pigments according to the invention can be incorporated or formulated into plastics such as those indicated above in a proportion by weight typically ranging either from 0.01% to 5% (for the final product) or from 40% to 70% in the case of a concentrate.

The pigments of the invention are also useful in the field of paints and varnishes and, more particularly, are advantageously incorporated in the following resins: alkyd resins, the most well known of which being glycerophthalic resins; modified long- or short-oil resins; acrylic resins prepared from esters of acrylic acid (methyl or ethyl) and from esters of methacrylic acid, optionally copolymerized with ethyl, 2-ethylhexyl or butyl acrylate; vinyl resins such as, for example, poly(vinyl acetate), poly(vinyl chloride), poly(vinyl butyral), poly(vinyl formal), and vinyl chloride and vinyl acetate or vinylidene chloride copolymers; aminoplastic or phenolic resins, usually modified; polyester resins; polyurethane resins; epoxy resins; silicone resins; etc.

Generally, the pigments are incorporated in a proportion of 5% to 30% by weight of the paint and of 0.1% to 5% by weight of the varnish.

The pigments of the invention are also suitable for the coloration of ceramics, such as, for example, porcelain, earthenware and stoneware, either by coloring the entire mass of the ceramic (physical admixing of the ceramic powder with the pigment) or by coloring solely the face surface thereof by means of glazes (glassy coating compositions) containing the pigment.

In this application, the amount of pigments used typically ranges from 1% to 30% by weight with respect either to the total mass of the ceramic, or with respect to the glaze alone.

In addition, the pigments according to the invention are also suitable for applications in the rubber industry, especially in floor coatings, in the paper and printing inks industry and in the field of cosmetics, as well as in many other fields such as, for example, and without limitation, dyes, leather finishing and laminated coatings for kitchens and other work surfaces.

Thus, the present invention also features colored compositions and substrates, especially of the plastic, paint, varnish, rubber, ceramic, glaze, paper, ink, cosmetic, dye and laminated coating type, which comprise the novel pigments described above.

In order to further illustrate the present invention and the advantages thereof, the following specific examples are given, it being understood that same are intended only as illustrative and in nowise limitative.

EXAMPLE 1

This example describes the preparation of pigments according to the invention based on terbium.

The oxides $Tb_4O_7$ and $ZrO_2$ (Rhône-Poulenc) were mixed in an agate crucible, the percentage by mass of terbium oxide being varied. The mixture was calcined in a muffle furnace under air at 1,600° C. for 3 hours (increase and decrease adjusted to 200° C./h).

The characteristics of the products obtained are reported in Table 1 below.

The intrinsic coloration of the pigments according to the invention was quantified by means of the chromaticity coordinates L, a and b given in the CIE system 1976 (L, a, b) as defined by the Commission Internationale d'Eclairage [International Commission on Illumination] and listed in the Recueil des Normes Françaises (AFNOR) [French Standards Compendium], colorimetric color No. X08-12 (1983). They were determined using a colorimeter marketed by Pacific Scientific. The nature of the illuminant was D65. The observation surface was a circular pellet having a surface area of 12.5 cm$^3$. The observation conditions corresponded to viewing under an aperture angle of 10°. In the measurements reported, the specular component was excluded.

L provides a measurement of the reflectance (light/dark shade) and thus varies from 100 (white) to 0 (black).

a and b are the values of the coloration tendencies:

positive a=red negative a=green positive b=yellow negative b=blue

L therefore represents the variation from black to white, a the variation from green to red and b the variation from yellow to blue.

The structure was determined by analysis of the X-ray diffraction spectra.

TABLE 1

| Tests | Structure | L | a | b |
| --- | --- | --- | --- | --- |
| $ZrO_2$ + 1% $Tb_4O_7$ | 100% monoclinic | 79.8 | 12.9 | 50.2 |
| $ZrO_2$ + 5% $Tb_4O_7$ | 20% tetragonal 80% monoclinic | 74.5 | 20.6 | 61.8 |
| $ZrO_2$ + 10% $Tb_4O_7$ | 60% tetragonal 40% monoclinic | 76 | 18.5 | 52.3 |
| $ZrO_2$ + 15% $Tb_4O_7$ | 80% tetragonal 20% monoclinic | 76.9 | 18.0 | 50.6 |

EXAMPLE 2

The procedure of Example 1 was repeated, under the same conditions, but varying the nature and the proportions of additives. The results obtained are reported in Table 2 below:

TABLE 2

| Tests | $Pr_6O_{11}$ | $Pr_6O_{11}/Tb_4O_7$ | $Pr_6O_{11}/CeO_2$ | $Tb_4O_7/CeO_2$ | $Tb_4O_7/CeO_2$ | $Tb_4O_7/CeO_2$ | $Tb_4O_7/Pr_6O_{11}/CeO_2$ |
| --- | --- | --- | --- | --- | --- | --- | --- |
| Proportions | | (50/50) | (50/50) | (50/50) | (75/25) | (66/33) | (1/3;1/3;1/3) |
| % by weight | 5 | 5 | 5 | 5 | 5 | 5 | 5 |
| L | 71.2 | 69.1 | 73.0 | 70.9 | 69.9 | 68.6 | 69.5 |
| a | 17.7 | 21.2 | 18.3 | 26.3 | 25.4 | 27.6 | 23.3 |
| b | 57.5 | 56.0 | 58.4 | 59.9 | 57.9 | 59.0 | 57.3 |
| Structure | Mono + Tetra (<20%) + $Pr_6O_{11}$ | Mono + Tetra (<20%) | Mono + trace Tetra | Mono | Mono + Tetra (<20%) | Mono + trace Tetra | Mono + trace Tetra |

EXAMPLE 3

The procedure of Example 1 was repeated, under the same conditions, but starting from a mixed oxide $(Ce_{0.95}Pr_{0.05})O_2$ for the product based on cerium and praseodymium. The contents of additive were 5% by weight.

The results obtained are reported in Table 3:

TABLE 3

| Tests | Ce/Pr | Ce/Pr | $CeO_2/Tb_4O_7$ |
| --- | --- | --- | --- |
| Proportions | (95/5) | (98/2) | (95/5) |
| L | 82.2 | 86.5 | 84.7 |
| a | 7.4 | 2.4 | 6.4 |
| b | 53.2 | 40.2 | 42.7 |
| Structure | Mono | Mono | Mono |

The combination of the above examples evidences that the pigments of the invention extend over a wide range of coloration, these examples relating to products extending, for the colorimetric coordinates, from the point a=2.4, b=40.2 to the point a=26.3, b=59.9.

EXAMPLE 4

This example describes the application of the pigment of Example 1 containing 5% of $Tb_4O_7$ in a glaze.

A slip having the following composition was prepared:

Frit, Ferro F 87, 80 g. This frit contained 27% of $SiO_2$ and 9% of PbO (by weight).

| Pigment | 5 g |
| --- | --- |
| Gum arabic | 0.24 g |
| Deionized water | 50 ml |

The materials constituting the slip were ground in a 250-ml corundum jar equipped with beads and with a planetary grinder for 1 hour. The ground mixture was sieved at 100 μm.

The glaze thus obtained was applied by spraying a white earthenware shard with a spray gun. The mass of glaze deposited was 20 g/dm$^2$.

Firing was carried out for 30 minutes at 950° C. after an increase in temperature of 6 hours.

The colorimetric results were as follows:

TABLE 4

|  | L | a | b |
|---|---|---|---|
| Pigment | 74.5 | 20.6 | 61.8 |
| Tile | 71.8 | 23.8 | 70.9 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A yellow/orange pigment composition comprising a major amount of a zirconium oxide and about 0.5% to about 20% by weight of cerium, said zirconium oxide being in an essentially monoclinic crystalline form and said cerium being confined within a crystalline lattice of said zirconium oxide.

2. A yellow/orange pigment composition as defined by claim 1, wherein said zirconium oxide and said cerium are in a solid solution.

3. A yellow/orange pigment composition as defined by claim 1, wherein said zirconium oxide is zirconium dioxide.

4. A yellow/orange pigment composition as defined by claim 1, comprising from 1% to 10% by weight of said cerium.

5. A yellow/orange pigment composition as defined by claim 1, further comprising a stabilizing amount of a rare earth metal other than cerium.

6. A yellow/orange pigment composition as defined by claim 1, wherein said cerium is in the form of an oxide.

7. A yellow/orange pigment composition comprising a major amount of a zirconium oxide and about 0.5% to about 20% by weight of terbium, said composition being devoid of silica and zirconium silicate.

8. A yellow/orange pigment composition as defined by claim 7, said terbium being confined within a crystalline lattice of said zirconium oxide.

9. A yellow/orange pigment composition as defined by claim 7, having a chromaticity coordinate a of at least 10.

10. A yellow/orange pigment composition as defined by claim 7, wherein said terbium is in the form of an oxide.

11. A yellow/orange pigment composition as defined by claim 7, said zirconium oxide being in an essentially monoclinic crystalline form.

12. A yellow/orange pigment composition as defined by claim 11, wherein said zirconium oxide is zirconium dioxide.

13. A yellow/orange pigment composition as defined by claim 11, said terbium being confined within a crystalline lattice of said zirconium oxide.

14. A yellow/orange pigment composition as defined by claim 13, wherein said zirconium oxide and said terbium are in a solid solution.

15. A yellow/orange pigment composition as defined by claim 7, further comprising cerium or praseodymium or both.

16. A yellow/orange pigment composition as defined by claim 15, wherein said terbium, cerium, and/or praseodymium are in the form of oxides thereof.

17. A yellow/orange pigment composition as defined by claim 15, further comprising a stabilizing amount of a rare earth metal other than cerium, praseodymium, or terbium.

18. A yellow/orange pigment composition as defined by claim 15, said cerium or praseodymium or both being confined within a crystalline lattice of zirconium oxide.

19. A yellow/orange pigment composition as defined by claim 15, comprising from 0.5% to 20% by weight of said terbium, cerium, and/or praseodymium.

20. A yellow/orange pigment composition as defined by claim 19, comprising from 1% to 10% by weight of said terbium, cerium, and/or praseodymium.

21. A yellow/orange pigment composition comprising a major amount of a zirconium oxide and about 0.5% to about 20% by weight of praseodymium, said zirconium oxide being in an essentially monoclinic crystalline form, said composition having a chromaticity coordinate a of at least 10 and being devoid of silica and zirconium silicate.

22. A yellow/orange pigment composition as defined by claim 21, having a chromaticity coordinate a of at least 15.

23. A process for the preparation of the pigment composition as defined by claim 15, comprising intimately admixing said zirconium oxide with oxides of cerium, praseodymium, and/or terbium, or intimately admixing precursors of said oxides and said zirconium oxide, and calcining the mixture thus formulated.

24. The process as defined by claim 23, comprising calcining at a temperature of at least 1,550° C.

25. The process as defined by claim 23, comprising intimately admixing a mixed oxide of cerium, praseodymium, and/or terbium with said zirconium oxide.

26. A yellow/orange paint, plastic, varnish, rubber, ceramic, glaze, paper, ink, cosmetic, dye, or coating comprising an effective yellow/orange colorant amount of the pigment composition as defined by claim 15.

* * * * *